(12) United States Patent
Tsai

(10) Patent No.: US 12,305,037 B2
(45) Date of Patent: May 20, 2025

(54) FUNCTIONAL FILM AND METHOD FOR MANUFACTURING THE SAME

(71) Applicant: G-FUN INDUSTRIAL CORPORATION, Taoyuan (TW)

(72) Inventor: Chiu-Hsiung Tsai, Taoyuan (TW)

(73) Assignee: G-FUN INDUSTRIAL CORPORATION, Taoyuan (TW)

( * ) Notice: Subject to any disclaimer, the term of this patent is extended or adjusted under 35 U.S.C. 154(b) by 175 days.

(21) Appl. No.: 17/510,495

(22) Filed: Oct. 26, 2021

(65) Prior Publication Data
US 2022/0204762 A1 Jun. 30, 2022

(30) Foreign Application Priority Data
Dec. 29, 2020 (TW) ................. 109146734

(51) Int. Cl.
*C08L 75/04* (2006.01)
*B29C 39/00* (2006.01)
(Continued)

(52) U.S. Cl.
CPC ............ *C08L 75/04* (2013.01); *B29C 39/003* (2013.01); *C08J 5/18* (2013.01); *B29K 2075/00* (2013.01);
(Continued)

(58) Field of Classification Search
CPC .. C08L 75/04; C08L 2201/08; C08L 2203/16; C08L 2207/20; C08J 5/18; B29K 2075/00; C29K 2105/0011; B29C 39/003
See application file for complete search history.

(56) References Cited

U.S. PATENT DOCUMENTS

| 4,452,845 A | 6/1984 | Lloyd et al. |
| 5,712,326 A | 1/1998 | Jones et al. |

(Continued)

FOREIGN PATENT DOCUMENTS

| CN | 1515605 A | 7/2004 |
| CN | 1723235 A | 1/2006 |

(Continued)

OTHER PUBLICATIONS

English Machine Translation of JP 04317654A. (Year: 1992).*
(Continued)

*Primary Examiner* — John E Uselding
(74) *Attorney, Agent, or Firm* — Li & Cai Intellectual Property (USA) Office

(57) ABSTRACT

A functional film and a method for manufacturing the same are provided. The functional film includes a polyurethane resin matrix and a plastic optical molding material. In the functional film, a content of the polyurethane resin matrix is between 48 wt % and 95 wt %, and a content of the plastic optical molding material is between 5 wt % and 50 wt %. The functional film further includes an ultraviolet absorber, an antioxidant additive, and an antibacterial additive. The functional film satisfies following test standards: (1) reaching level 4 of a phenolic yellowing test; (2) passing at least 60 hours of a QUV (ASTM G154) test; (3) passing at least four weeks of a water decomposition resistance test under the test conditions of 70° C. and 95% relative humidity; and (4) passing at least one certification of Global Recycle Standard (GRS) and Recycled Claim Standard (RCS).

2 Claims, 1 Drawing Sheet

(51) Int. Cl.
    *C08J 5/18* (2006.01)
    *B29K 75/00* (2006.01)
    *B29K 105/00* (2006.01)

(52) U.S. Cl.
    CPC ... *B29K 2105/0011* (2013.01); *C08J 2375/04* (2013.01); *C08J 2425/06* (2013.01); *C08J 2433/12* (2013.01); *C08J 2445/00* (2013.01); *C08J 2469/00* (2013.01); *C08L 2201/08* (2013.01); *C08L 2203/16* (2013.01); *C08L 2207/20* (2013.01)

(56) References Cited

U.S. PATENT DOCUMENTS

| | | | |
|---|---|---|---|
| 6,514,286 | B1 | 2/2003 | Leatherbury et al. |
| 8,722,788 | B2 | 5/2014 | Schultes et al. |
| 2005/0070665 | A1 | 3/2005 | Ludlow |
| 2007/0036983 | A1 | 2/2007 | Takeda et al. |
| 2009/0061172 | A1 | 3/2009 | Hayashi et al. |
| 2017/0130094 | A1 | 5/2017 | Kawaguchi et al. |
| 2018/0207613 | A1 | 7/2018 | Bohringer et al. |
| 2018/0265733 | A1 | 9/2018 | Komatsuzaki et al. |
| 2020/0062993 | A1 | 2/2020 | Grogan et al. |
| 2020/0317886 | A1 | 10/2020 | Pfaendner et al. |

FOREIGN PATENT DOCUMENTS

| | | | |
|---|---|---|---|
| CN | 102757637 A | 10/2012 | |
| CN | 102691175 B | 10/2014 | |
| CN | 104109371 A | 10/2014 | |
| CN | 104371171 A | 2/2015 | |
| CN | 105924939 A | 9/2016 | |
| CN | 106488938 A | 3/2017 | |
| CN | 106939123 A | 7/2017 | |
| CN | 108026367 A | 5/2018 | |
| CN | 111526989 A | 8/2020 | |
| EP | 0046071 A2 | 2/1982 | |
| JP | 53106743 A | 9/1978 | |
| JP | 5589371 A | 7/1980 | |
| JP | 60141710 A | 7/1985 | |
| JP | 61152878 A | 7/1986 | |
| JP | 6253340 A | 3/1987 | |
| JP | 2147662 A | 6/1990 | |
| JP | 04317654 A * | 11/1992 | ............ A61L 15/44 |
| JP | 5156043 A | 6/1993 | |
| JP | 673365 A | 3/1994 | |
| JP | 6263979 A | 9/1994 | |
| JP | 6313053 A | 11/1994 | |
| JP | 7504459 A | 5/1995 | |
| JP | 853596 A | 2/1996 | |
| JP | 867814 A | 3/1996 | |
| JP | 1067860 A | 3/1998 | |
| JP | 11256030 A | 9/1999 | |
| JP | 2002527560 A | 8/2002 | |
| JP | 200326867 A | 1/2003 | |
| JP | 2004155824 A | 6/2004 | |
| JP | 2004161959 A | 6/2004 | |
| JP | 2005170996 A | 6/2005 | |
| JP | 2009516766 A | 4/2009 | |
| JP | 2009298954 A | 12/2009 | |
| JP | 2011144270 A | 7/2011 | |
| JP | 2015113468 A | 6/2015 | |
| JP | 2018115320 A | 7/2018 | |
| JP | 202085980 A | 6/2020 | |
| JP | 2020535286 A | 12/2020 | |
| KR | 1020060101475 A | 9/2006 | |
| KR | 101322761 B1 | 11/2013 | |
| TW | 202010614 A | 3/2020 | |
| WO | WO-9824483 A2 * | 6/1998 | ............ A61L 27/12 |
| WO | WO 2016143136 A1 | 9/2016 | |

OTHER PUBLICATIONS

Liu,Dao-Chun, "Water-Based Polyurethane Coating Finishing Technology for Fabrics", Screen Printing Industry, Issue 8, Aug. 15, 2017(Aug. 15, 2017), pp. 44-51.

* cited by examiner

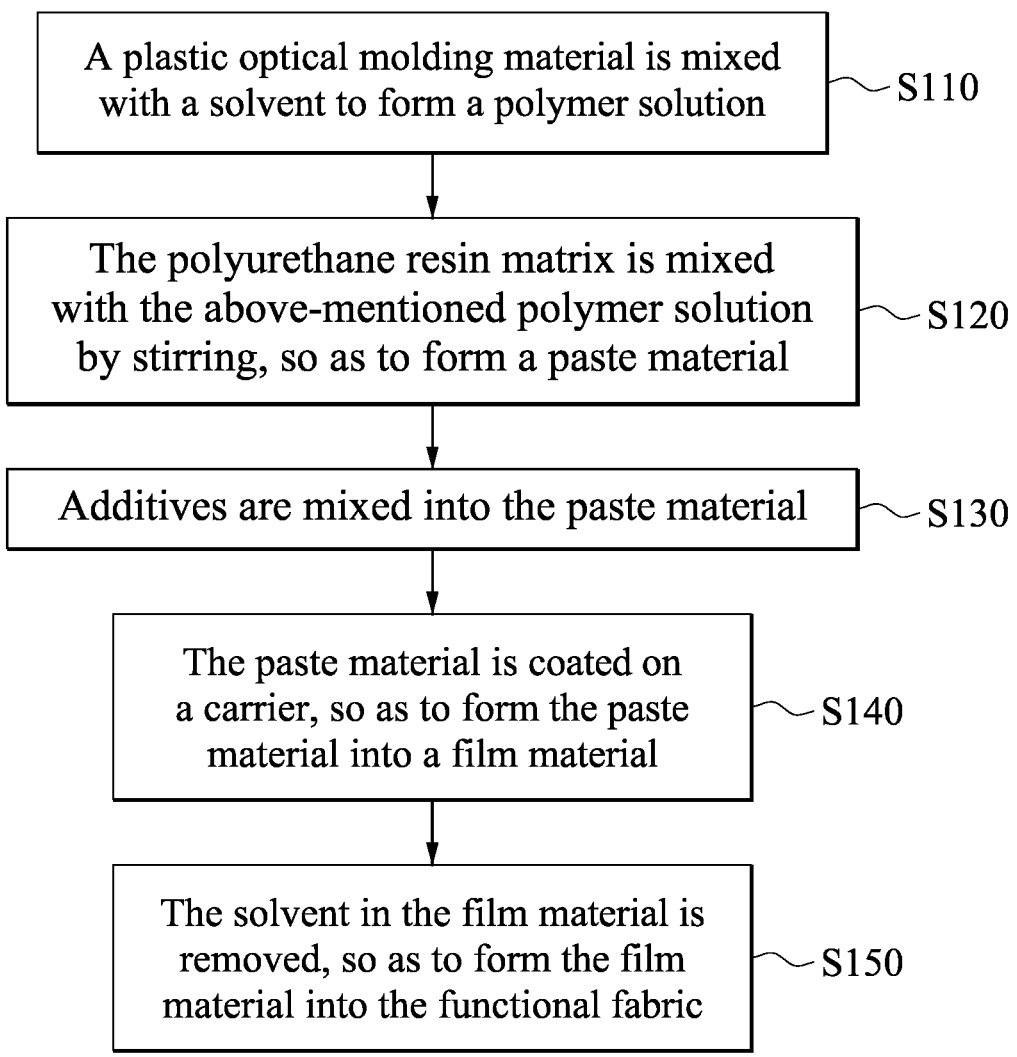

FUNCTIONAL FILM AND METHOD FOR MANUFACTURING THE SAME

CROSS-REFERENCE TO RELATED PATENT APPLICATION

This application claims the benefit of priority to Taiwan Patent Application No. 109146734, filed on Dec. 29, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a functional fabric, and more particularly to a functional fabric and a method for manufacturing the same.

BACKGROUND OF THE DISCLOSURE

Conventional waterproof and moisture-permeable films have been able to achieve better waterproof and moisture-permeable performance through improvement of various manufacturing processes or process conditions, so as to be applicable to many textile products or functional fabrics. However, the conventional waterproof and moisture-permeable film can pass a water decomposition test ("Jungle Test") for only two weeks (under test conditions of 70° C. temperature and 95% relative humidity), and pass a QUV (ASTM G154) test for only 30 hours. Although a plastic recycled material is added to the waterproof and moisture-permeable film, a tensile strength thereof is not significantly improved.

SUMMARY OF THE DISCLOSURE

In response to the above-referenced technical inadequacies, the present disclosure provides a functional fabric and a method for manufacturing the same.

In one aspect, the present disclosure provides a method for manufacturing a functional fabric, which includes the following steps. A plastic optical molding material is mixed with a solvent and is subjected to heat treatment at a temperature from 50° C. to 100° C., so as to form a polymer solution. A polyurethane resin matrix is mixed with the polymer solution to form a paste material with a viscosity ranging from 1,000 cP to 4,000 cP. The paste material is coated on a carrier, so as to form the paste material into a film material. The solvent in the film material is removed, so as to form the film material into the functional fabric. In addition, in the functional fabric, a content of the plastic optical molding material is between 5 wt % and 50 wt %, and a content of the polyurethane resin matrix is between 48 wt % and 95 wt %.

In another aspect, the present disclosure provides a functional fabric that includes a polyurethane resin matrix and a plastic optical molding material. A weight percentage of the polyurethane resin matrix in the functional fabric ranges from 48 wt % to 95 wt %. The plastic optical molding material is dispersed in the polyurethane resin matrix, and a weight percentage of the plastic optical molding material in the functional fabric ranges from 5 wt % to 50 wt %. In addition, the functional fabric satisfies following test standards: (1) reaching level 4 of a phenolic yellowing test; (2) passing at least 60 hours of a QUV (ASTM G154) test, in which an appearance of the functional fabric is normal and without cracks; (3) passing at least four weeks of a water decomposition resistance test under the test conditions of 70° C. temperature and 95% relative humidity; and (4) passing at least one certification of Global Recycle Standard (GRS) and Recycled Claim Standard (RCS).

Therefore, by virtue of "pre-dissolving the plastic optical molding material in the solvent, and then mixing the plastic optical molding material with the polyurethane resin matrix to form a paste material with a uniform concentration and a specific viscosity", the functional fabric and the method for manufacturing the same provided by the present disclosure can effectively improve compatibility and dispersion uniformity between the plastic optical molding material and the polyurethane resin matrix, thereby allowing the finally-formed functional fabric to maintain a certain degree of waterproof and moisture permeability.

Further, since the plastic optical molding material disclosed in the embodiment of the present disclosure can be selected from recycled plastic optical molding materials, the manufacturing cost of the functional fabric can be reduced. In addition, the goal of waste recycling and reuse, environmental protection and energy saving can be achieved (the functional fabric can pass the certification of Global Recycle Standard (GRS) and/or RCS).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1 is a flowchart of a functional fabric according to an embodiment of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way.

Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

[Method for Manufacturing Functional Fabric]

Referring to FIG. 1, this embodiment of the present disclosure provides a method for manufacturing functional fabric, which includes step S110, step S120, step S130, step S140, and step S150. It should be noted that the order of the steps and the actual operation mode illustrated in this embodiment can be adjusted according to requirements, and the present disclosure is not limited thereto.

In Step S110, a plastic optical molding material is mixed with a solvent to form a polymer solution. In order for an appropriate amount of the plastic optical molding material to be uniformly dispersed and dissolved into the solvent, the plastic optical molding material and the solvent have an exemplary ratio configuration in terms of content range. Temperature-wise, there is also an exemplary temperature operating range to perform the mixing. Specifically, in step S110, 5 wt % to 50 wt % of the plastic optical molding material is mixed with 48 wt % to 95 wt % of the solvent. Further, the above-mentioned mixture containing the plastic optical molding material and the solvent is heated and stirred at a temperature from 50° C. to 100° C., so that the plastic optical molding material can be uniformly dispersed and dissolved in the solvent, thereby forming the polymer solution.

Preferably, a content of the plastic optical molding material is between 8 wt % and 50 wt %, and a content of the solvent is between 48 wt % and 90 wt %, but the present disclosure is not limited thereto.

In terms of material types, the plastic optical molding material is at least one selected from the group consisting of cycloolefin polymer (COP), cycloolefin copolymer (COC), poly(methyl methacrylate) (PMMA), polycarbonate (PC), and polystyrene (PS). Preferably, the plastic optical molding material is at least one selected from the group consisting of cycloolefin polymer, cycloolefin copolymer, poly(methyl methacrylate), and polycarbonate. More preferably, the plastic optical molding material is at least one of cycloolefin polymer and cycloolefin copolymer, but the present disclosure is not limited thereto.

In terms of physical and chemical properties, the plastic optical molding material has a refractive index between 1.45 and 1.60, and preferably between 1.48 and 1.55. The plastic optical molding material has an Abbe number between 30 and 60, and preferably between 50 and 60. The plastic optical molding material has a visible light transmittance of not less than 85%, and preferably not less than 88%. The plastic optical molding material has a thermal expansion coefficient between 50 and 70, and preferably between 60 and 70. In addition, in certain embodiments, the plastic optical molding material is a plastic material suitable for manufacturing optical lenses, but the present disclosure is not limited thereto.

It is worth mentioning that the plastic optical molding material can be, for instance, a recycled plastic optical molding material. Specifically speaking, the recycled plastic optical molding material can be, for instance, unqualified products, scraps, and trimmings generated by the raw material of the plastic optical molding material during a manufacturing process, or any molded product of discarded plastic optical molding materials.

In terms of solvent selection, in order to be able to dissolve the plastic optical molding material uniformly, and to increase the compatibility and dispersion uniformity between the plastic optical molding material and the polyurethane resin matrix described below, the solvent in this embodiment is at least one selected from the group consisting of dimethylformamide (DMF), methyl ethyl ketone (MEK), toluene (TOL), isopropanol (IPA), and ethyl acetate (EAC), but the present disclosure is not limited thereto. For instance, as long as the selected solvent can dissolve the plastic optical molding material and increase the compatibility and dispersion uniformity between the plastic optical molding material and the polyurethane resin matrix, said solvent is within the spirit and scope of the present disclosure.

In Step S120, the polyurethane resin matrix is mixed with the above-mentioned polymer solution by stirring, so as to form a paste material (also called a slurry-like material or mushy material).

In order to enable the paste material to be processed more easily in subsequent process steps (such as step S130), the viscosity of the paste material is preferably adjusted to be between 1,000 centipoise (cP) and 4,000 centipoise (cP), and more preferably between 1500 cP and 3,000 cP. The viscosity of the paste material can be achieved, for instance, by adjusting the mixing ratio between the polyurethane resin matrix and the polymer solution, or by adding an appropriate amount of thickener.

In order to increase material properties of the finally-formed functional fabric, the method for manufacturing the functional fabric can further include (step S130): mixing a silicon-containing additive into the paste material, so that the functional fabric after being formed contains the silicon-containing additive.

In certain embodiments, in order to increase surface smoothness of the finally-formed functional fabric, the silicon-containing additive may be an organic silicon-containing additive with an alkoxysilane in the molecular structure, and the organic silicon-containing additive can be selected from at least one of polydimethylsiloxane, polymethylphenylsiloxane, polyether polyester modified organosiloxane, and alkyl-modified organosiloxane.

The material of the silicon-containing additive can simply be selected from one of the above-mentioned material types, or can be a combination of two or more selected from the above-mentioned material types, but the present disclosure is not limited thereto. For instance, the silicon-containing additive can be selected from both polydimethylsiloxane that can improve surface flatness of the film and silicon dioxide that can improve anti-adhesion properties of the film. Further, regardless of the selection of the material type of the above-mentioned silicon-containing additive, a weight percentage of the silicon-containing additive in the finally-formed functional fabric is preferably within a range from 0.01 wt % to 5 wt %. In certain embodiments, in order to increase the UV resistance of the finally-formed functional fabric, the method for manufacturing the functional fabric can further include (step S130): mixing an ultraviolet absorber into the paste material, so that the functional fabric after being formed contains the ultraviolet absorber.

A weight percentage of the ultraviolet absorber in the finally-formed functional fabric is preferably within a range from 0.1 wt % to 5.0 wt %. The ultraviolet absorber is at least one selected from the group consisting of benzophenone, benzotriazole, triazine, formamidine, malonate, and benzoxazine. The material type of the above-mentioned ultraviolet absorber is particularly suitable for being added to the polymer solution of the polyurethane resin matrix and the plastic optical molding material. That is to say, the above-mentioned ultraviolet absorber has good compatibility and dispersibility with the polymer solution, so that the functional fabric has good UV resistance. If other types of UV absorbers are used, the functional fabric may not have good UV resistance.

In certain embodiments, in order to increase an antibacterial ability of the finally-formed functional fabric, the method for manufacturing the functional fabric can further include (step S130): mixing an antibacterial additive into the paste material, so that the functional fabric after being formed contains the antibacterial additive.

A weight percentage of the antibacterial additive in the finally-formed functional fabric is preferably within a range from 0.2 wt % to 8.0 wt %. The antibacterial additives are inorganic substances (such as metal ions having antibacterial properties) and their complexes with inorganic carriers, such as silver ion antibacterial agents, zinc ion antibacterial agents, and so on. In this way, the functional fabric has an antibacterial activity value of not less than 2.0 (in compliance with FTTS-FA-027, AATCC-100, JIS-L1902, ASTM-E2149, or ISO-20743 antibacterial textile verification specifications).

In Step S140, the paste material is coated on a carrier, so as to form the paste material into a film material. The paste material can be coated on the carrier, for instance, by scraping, spraying, or rolling. Furthermore, a coating amount of the paste material applied to the carrier is preferably 15 g to 60 g of the paste material (more preferably 15 g to 50 g) per square meter of the carrier, and the carrier is preferably at least one selected from paper and cloth.

It should be noted that since the film material is formed by having the paste material coated on the carrier, a composition of the film material is the same as that of the paste material. More specifically, the composition of the film material includes the plastic optical molding material, the polyurethane resin matrix, and the solvent (and optionally includes the silicon-containing additive, anti-ultraviolet absorber, or antibacterial additive according to the situation).

In the finally-formed functional fabric, a total weight percentage of the above components (including the polyurethane resin matrix, the plastic optical molding material, and other additives, such as the silicon-containing additive, the ultraviolet absorber, and the antibacterial additive) is 100 wt %.

Preferably, this embodiment further includes a defoaming treatment step before the step of coating the paste material on the carrier, but the present disclosure is not limited thereto. In the defoaming treatment step, a vacuum defoaming machine or a defoaming agent is used to defoam the paste material, so as to remove bubbles in the paste material. In this way, air bubbles can be prevented from affecting the waterproof and moisture-permeable performance or other physical and chemical properties of the functional fabric, and the product yield of the functional fabric can be improved.

In Step S150, the solvent in the film material is removed, so as to form the film material into the functional fabric.

In the functional fabric, the content of the plastic optical molding material is between 5 wt % and 50 wt % (preferably between 8 wt % and 50 wt %), and a content of the polyurethane resin matrix is between 48 wt % and 95 wt % (preferably between 48 wt % and 90 wt %). A residual concentration of the solvent is preferably between 50 ppm and 400 ppm, and is more preferably between 100 ppm and 300 ppm.

The functional fabric is a continuous film exhibiting waterproof and moisture-permeable characteristics. The functional fabric has a water resistance ranging from 5,000 $mmH_2O$ to 20,000 $mmH_2O$ (preferably from 10,000 $mmH_2O$ to 20,000 $mmH_2O$), a moisture permeability ranging from 50,000 $g/m^2/day$ to 150,000 $g/m^2/day$ (preferably from 60,000 $g/m^2/day$ to 130,000 $g/m^2/day$), and a tensile strength ranging from 50 $kg/cm^2$ to 350 $kg/cm^2$ (preferably from 60 $kg/cm^2$ to 350 $kg/cm^2$, and more preferably from 120 $kg/cm^2$ to 350 $kg/cm^2$). It is worth mentioning that the functional fabric of the present disclosure is not limited to the continuous film exhibiting waterproof and moisture-permeable. In other embodiments of the present disclosure, the functional fabric can also be a porous film exhibiting waterproof and moisture-permeable.

According to the above configuration, the functional fabric satisfies following test standards: (1) reaching level 4 of a phenolic yellowing test; (2) passing at least 60 hours of a QUV (ASTM G154) test, in which an appearance of the functional fabric is normal and without cracks; (3) passing at least four weeks of a water decomposition resistance test (Jungle Test) under test conditions of 70° C. temperature and 95% relative humidity; and (4) passing at least one certification of Global Recycle Standard (GRS) and Recycled Claim Standard (RCS).

Further, in step S150, the solvent in the film material can be removed through, for instance, a dry processing step.

Dry Processing Step

The dry processing step includes: drying the film material at a predetermined temperature (such as from 60° C. to 180° C.) through a drying machine, so as to remove the solvent in the film material and allow the film material to be formed into the functional fabric with waterproof and moisture-permeable properties; and separating the functional fabric from the carrier to facilitate the application of the final product. In this embodiment, the functional fabric formed after the dry processing step is a continuous film. However, the present disclosure is not limited thereto, and the functional fabric may also be a porous film.

Functional Fabric

This embodiment also discloses a functional fabric. The functional fabric can be made by the above-mentioned method for manufacturing the functional fabric, but the present disclosure is not limited thereto. The functional fabric includes a polyurethane resin matrix and a plastic optical molding material dispersed in the polyurethane resin matrix. In the functional fabric, the content of the polyurethane resin matrix is between 48 wt % and 95 wt % (preferably between 48 wt % and 90 wt %), and the content of the plastic optical molding material is between 5 wt % and 50 wt % (preferably between 8 wt % and 50 wt %).

The functional fabric further includes a solvent remaining in the polyurethane resin matrix and the plastic optical molding material, and the residual concentration of the solvent is between 50 ppm and 400 ppm.

The functional fabric further includes a silicon-containing additive, an ultraviolet absorber, and an antibacterial additive dispersed in the polyurethane resin matrix and cycloolefin polymer materials. In the functional fabric, the content of the silicon-containing additive is between 0.01 wt % and 5 wt %, the content of the ultraviolet absorber is between 0.1 wt % and 5.0 wt %, and the content of the antibacterial additive is between 0.2 wt % and 8.0 wt %.

The functional fabric is a continuous film exhibiting waterproof and moisture-permeable, and the functional fabric has a water resistance ranging from 5,000 mmH$_2$O to 20,000 mmH$_2$O, a moisture permeability ranging from 50,000 g/m$^2$/day to 150,000 g/m$^2$/day, and a tensile strength ranging from 50 kg/cm$^2$ to 350 kg/cm$^2$.

Further, the functional fabric satisfies the following test standards: (1) reaching level 4 of the phenolic yellowing test; (2) passing at least 60 hours of the QUV (ASTM G154) test, in which the appearance of the functional fabric is normal and without cracks; (3) passing at least four weeks of water decomposition resistance test (Jungle Test) under the test conditions of 70° C. temperature and 95% relative humidity; and (4) passing at least one certification of Global Recycle Standard (GRS) and Recycled Claim Standard (RCS).

It is worth mentioning that the functional fabric of this embodiment is particularly suitable for the production of various textile products or functional clothes.

Physical and Chemical Properties Test of Functional Fabric

The sample manufacturing method, test methods, and test results of the functional fabric of this embodiment are as follows.

The method for manufacturing the functional fabric is as follows. A plastic optical molding material (cycloolefin polymer being selected in this embodiment) is pre-melted and is mixed with a solvent (dimethylformamide being used in this embodiment), so as to form a polymer solution. A polyurethane resin matrix and the polymer solution are mixed with each other, and stirred at 1,000 rpm to 2,500 rpm for about two minutes to form a paste material with a viscosity ranging from 1,000 to 4,000 centipoise. Then, an ultraviolet absorber and an antimicrobial additive are mixed into the paste material, and the paste material is coated on a carrier to form a film material with a thickness ranging from 50 μm to 120 μm. Lastly, the film material is placed in a continuous multi-section drying equipment and dried at a temperature from 60° C. to 180° C., so that the film material is formed into a functional fabric.

Water resistance test (JIS L1092): in this embodiment, the water resistance of the functional fabric prepared by the processing steps is tested according to a high water pressure test (JIS L1092), and values of water resistance test data (mmH$_2$O) are recorded.

Moisture permeability test (JIS L1099B1): in this embodiment, the moisture permeability of the functional fabric prepared by the processing steps is tested according to a potassium acetate method (JIS L1099B1), and values of moisture permeability test data (g/m$^2$/day) are recorded.

Tensile strength test: after the functional fabric has undergone a yielding phenomenon, a stress is continuously applied onto the functional fabric, and the tensile strength of the functional fabric increases with an increase of the applied stress. When the applied stress reaches the highest point, the stress at that point is the ultimate tensile strength (UTS) of the functional fabric. As shown in the following formula, the maximum tensile strength (GUTS) can be defined as:

$$\sigma_{UTS} = \frac{P_{max}}{A_0}$$

$P_{max}$ is a load on the functional fabric at the maximum tensile strength, and $A_0$ is an original cross-sectional area of the functional fabric.

The phenolic yellowing test is based on ISO105-X18.

The QUV test is based on the ASTM G154 international standard test.

Jungle Test: a test sample is placed in an oven at a temperature of 70° C. and a relative humidity of 95%, so as to observe an appearance of the test sample after the test.

TABLE 1

Physical and chemical properties test results of functional fabric

| Test items | Common fabric containing only the polyurethane resin matrix | Functional fabric of the present embodiment |
|---|---|---|
| Water resistance (mmH$_2$O) | more than 17,000 | 5,000-20,000 |
| Moisture permeability (g/m$^2$/day) | more than 100,000 | 50,000-150,000 |
| Tensile strength (kg/cm$^2$) | 200-350 | 50-350 |
| Film weight (g) | 10-25 | 10-30 |
| Thickness (μm) | 10-30 | 10-30 |
| Phenolic yellowing test(level) | 3 | 4 |
| QUV test(hour) | 30 | 60 |
| Jungle test (week) | 2 | 4 |

According to the test results, it can be known that the functional fabric has a water resistance ranging from 5,000 mmH$_2$O to 20,000 mmH$_2$O, a moisture permeability ranging from 50,000 g/m$^2$/day to 150,000 g/m$^2$/day, and a tensile strength ranging from 50 kg/cm$^2$ to 350 kg/cm$^2$.

Further, the functional fabric satisfies the following test standards: (1) reaching level 4 of the phenolic yellowing test; (2) passing at least 60 hours of the QUV (ASTM G154) test, in which the appearance of the functional fabric is normal and without cracks; (3) passing at least four weeks of the water decomposition resistance test (Jungle Test) under test conditions of 70° C. temperature and 95% relative humidity; and (4) passing at least one certification of Global Recycle Standard (GRS) and Recycled Claim Standard (RCS).

Beneficial Effects of the Embodiments

In conclusion, by virtue of "pre-dissolving the plastic optical molding material in the solvent, and then mixing the plastic optical molding material with the polyurethane resin matrix to form a paste material with a uniform concentration and a specific viscosity", the functional fabric and the method for manufacturing the same provided by the present disclosure can effectively improve the compatibility and dispersion uniformity between the plastic optical molding material and the polyurethane resin matrix. In this way, the finally-formed functional fabric has a better tensile strength whilst maintaining a certain level of waterproof and moisture permeability, providing promising prospects in application.

Further, since the plastic optical molding material disclosed in the embodiment of the present disclosure can be selected from recycled plastic optical molding materials, the manufacturing cost of the functional fabric can be reduced. In addition, the goal of waste recycling and reuse, environmental protection and energy saving can be achieved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A functional film, comprising:
 a polyurethane resin matrix, a weight percentage of the polyurethane resin matrix in the functional film ranging from 48 wt % to 90 wt %;
 a plastic optical molding material dispersed in the polyurethane resin matrix, a weight percentage of the plastic optical molding material in the functional fabric film ranging from 8 wt % to 50 wt %; wherein the plastic optical molding material is a recycled plastic optical molding material being at least one selected from the group consisting of poly(methyl methacrylate) (PMMA), and polycarbonate (PC); and
 a solvent remaining in the polyurethane resin matrix and the plastic optical molding material, wherein a residual concentration of the solvent is between 100 ppm and 300 ppm, and the solvent is at least one selected from the group consisting of dimethylformamide (DMF), methyl ethyl ketone (MEK), toluene (TOL), isopropanol (IPA), and ethyl acetate (EAC);
 wherein the functional film is a continuous waterproof and moisture-permeable film, and the functional fabric film has a water resistance ranging from 5,000 mmH$_2$O to 20,000 mmH$_2$O, a moisture permeability ranging from 50,000 g/m$^2$/day to 150,000 g/m$^2$/day, and a tensile strength ranging from 50 kg/cm$^2$ to 350 kg/cm$^2$.

2. The functional film according to claim 1, further comprising an ultraviolet absorber and an antibacterial additive dispersed in the polyurethane resin matrix; wherein in the functional film, a content of the ultraviolet absorber is between 0.1 wt % and 5.0 wt %, and a content of the antibacterial additive is between 0.2 wt % and 8.0 wt %.

* * * * *